(12) United States Patent
Ultsch

(10) Patent No.: US 9,145,498 B2
(45) Date of Patent: Sep. 29, 2015

(54) POLYOLEFIN BASED FORMULATIONS FOR MEMBRANES AND FABRICS

(71) Applicant: Stefan Ultsch, Staefa (CH)

(72) Inventor: Stefan Ultsch, Staefa (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/379,373

(22) PCT Filed: Mar. 4, 2013

(86) PCT No.: PCT/US2013/028786
§ 371 (c)(1),
(2) Date: Aug. 18, 2014

(87) PCT Pub. No.: WO2013/134083
PCT Pub. Date: Sep. 12, 2013

(65) Prior Publication Data
US 2015/0038629 A1      Feb. 5, 2015

Related U.S. Application Data

(60) Provisional application No. 61/608,089, filed on Mar. 7, 2012.

(51) Int. Cl.
| | | |
|---|---|---|
| C08L 23/14 | (2006.01) | |
| C08K 3/20 | (2006.01) | |
| C08L 53/00 | (2006.01) | |
| B32B 27/32 | (2006.01) | |
| D06M 15/227 | (2006.01) | |
| D06N 3/00 | (2006.01) | |
| D06N 3/04 | (2006.01) | |
| E04D 5/10 | (2006.01) | |
| B32B 5/02 | (2006.01) | |
| B32B 7/12 | (2006.01) | |
| B32B 27/12 | (2006.01) | |

(52) U.S. Cl.
CPC . *C08L 53/00* (2013.01); *B32B 5/02* (2013.01); *B32B 7/12* (2013.01); *B32B 27/12* (2013.01); *B32B 27/32* (2013.01); *D06M 15/227* (2013.01); *D06N 3/0063* (2013.01); *D06N 3/045* (2013.01); *E04D 5/10* (2013.01); *B32B 2255/02* (2013.01); *B32B 2255/26* (2013.01); *B32B 2262/0253* (2013.01); *B32B 2262/101* (2013.01); *B32B 2262/106* (2013.01); *B32B 2307/3065* (2013.01); *B32B 2307/54* (2013.01); *B32B 2307/704* (2013.01); *B32B 2307/7265* (2013.01); *B32B 2419/06* (2013.01); *C08L 2201/02* (2013.01); *D06M 2200/30* (2013.01)

(58) Field of Classification Search
CPC ............ C08K 3/22; C08L 23/14; C08L 53/00
See application file for complete search history.

(56) References Cited

U.S. PATENT DOCUMENTS

| | | | |
|---|---|---|---|
| 5,272,236 A | 12/1993 | Lai et al. | |
| 5,278,272 A | 1/1994 | Lai et al. | |
| 5,504,172 A | 4/1996 | Imuta et al. | |
| 5,986,028 A | 11/1999 | Lai et al. | |
| 6,190,772 B1 * | 2/2001 | Yamano et al. | 428/379 |
| 6,444,736 B1 * | 9/2002 | Touhara et al. | 524/127 |
| 6,525,157 B2 | 2/2003 | Cozewith et al. | |
| 6,960,635 B2 | 11/2005 | Stevens et al. | |
| 7,858,706 B2 | 12/2010 | Arriola et al. | |
| 7,893,166 B2 | 2/2011 | Shan et al. | |
| 7,947,793 B2 | 5/2011 | Marchand et al. | |
| 2002/0111411 A1 | 8/2002 | Hase et al. | |
| 2005/0222314 A1 * | 10/2005 | Credali et al. | 524/423 |
| 2008/0179574 A1 * | 7/2008 | Yang et al. | 252/601 |
| 2010/0285253 A1 | 11/2010 | Hughes et al. | |
| 2011/0306715 A1 * | 12/2011 | Batra et al. | 524/505 |
| 2014/0378566 A1 * | 12/2014 | Munro et al. | 521/132 |

FOREIGN PATENT DOCUMENTS

| | | |
|---|---|---|
| EP | 0490394 A1 | 6/1992 |
| EP | 1221462 A1 | 7/2002 |
| JP | 52123442 A * | 10/1977 |
| WO | 00/01745 A1 | 1/2000 |
| WO | 2005/090427 A1 | 9/2005 |
| WO | 2006/101924 A2 | 9/2006 |
| WO | 2006/101932 A2 | 9/2006 |
| WO | 2009/067337 A1 | 5/2009 |
| WO | 2011/008336 A1 | 1/2011 |
| WO | 2011/079457 A1 | 7/2011 |
| WO | WO 2012068727 A1 * | 5/2012 |
| WO | 2013/090354 A1 | 6/2013 |

OTHER PUBLICATIONS

Derwent Abstract for JP 52-123442 (Acc. No. 1977-84048Y, 1977).*
PCT/US2013/028786, Jun. 7, 2013, International Search Report and Written Opinion.
PCT/US2013/028786, Sep. 18, 2014, International Preliminary Report on Patentability.

\* cited by examiner

*Primary Examiner* — Brieann R Fink

(57) ABSTRACT

The invention provides halogen-free, flame-retardant flexible polyolefin-based formulations.

8 Claims, 3 Drawing Sheets

Figure 1: Examples of Woven Fabrics (Scrim)
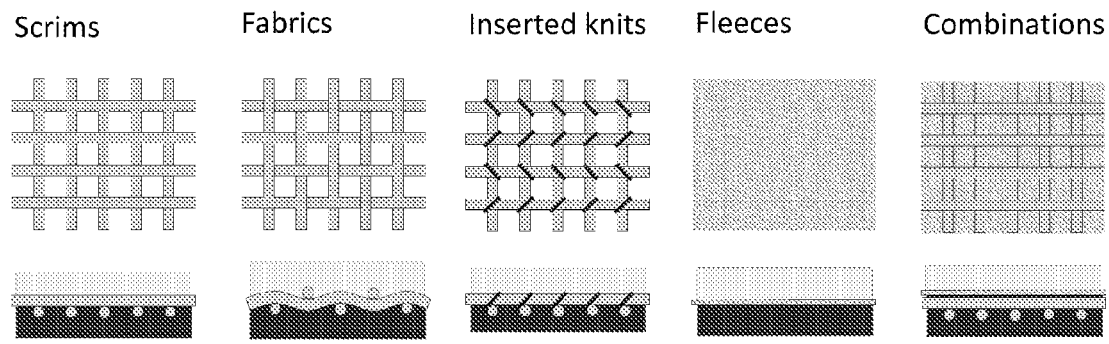
Figure 2: Sample preparation for weld testing
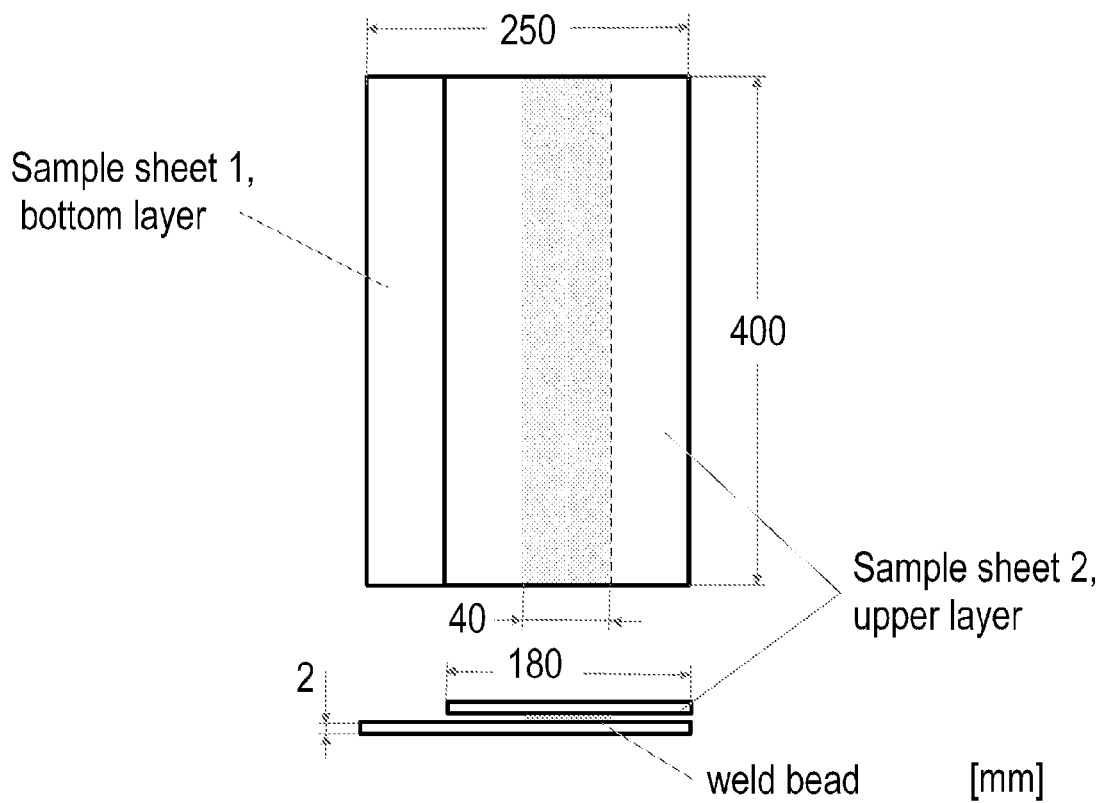

Figure 3: Cutting stripes for weld testing
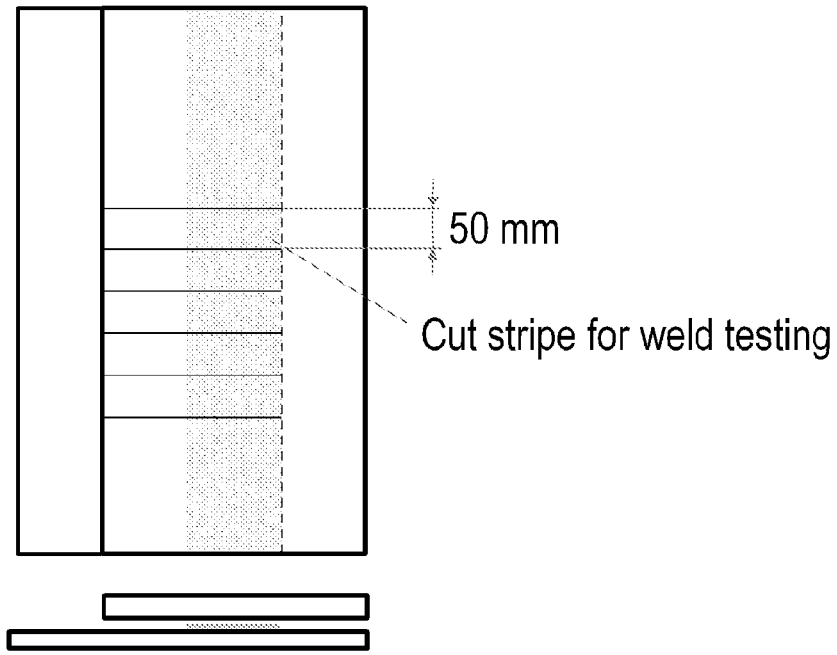
Figure 4: Testing of weld quality: tear with pliers until sample failure
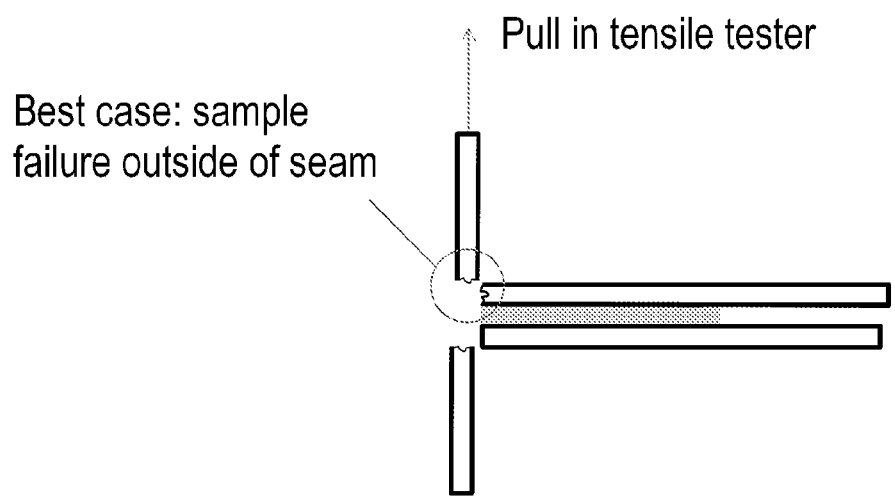

Figure 5: Sample failure inside the weld seam ("peal in the seam").
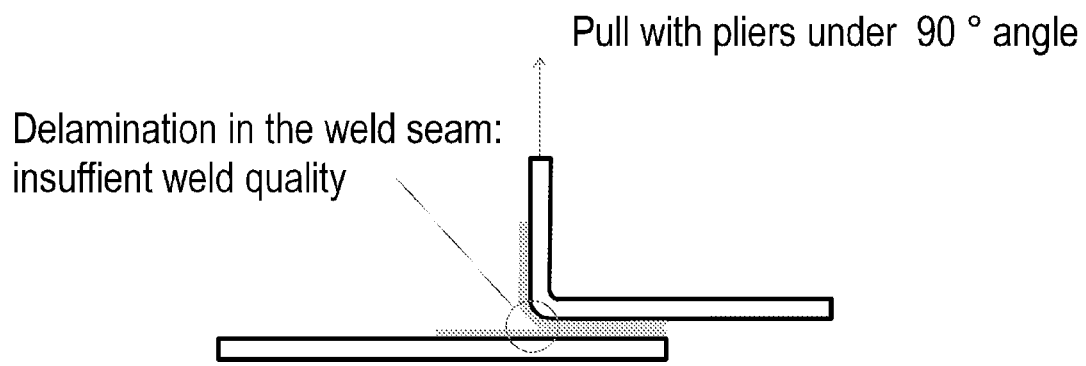
Figure 6: Schematic of Multi-Layer Structure
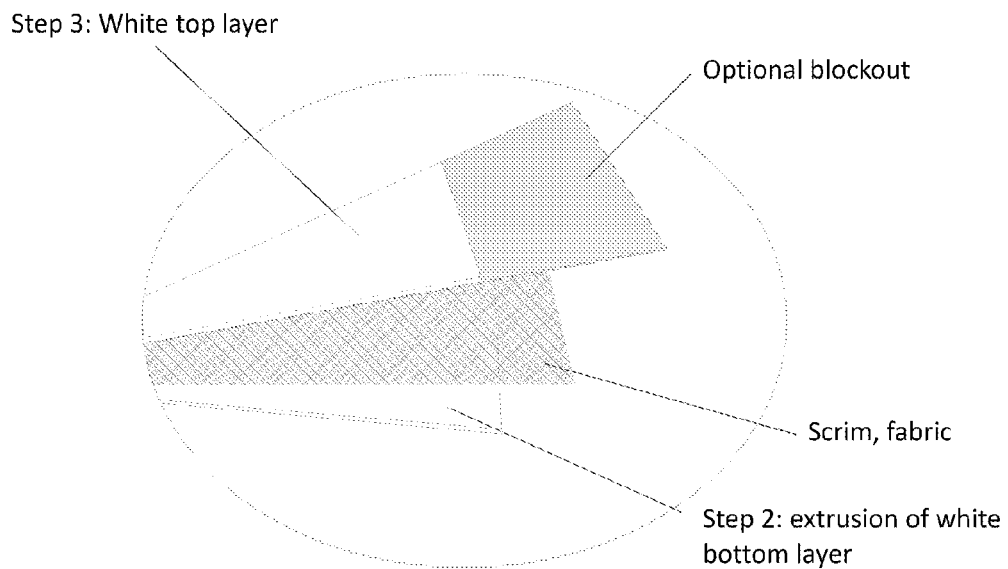

POLYOLEFIN BASED FORMULATIONS FOR MEMBRANES AND FABRICS

FIELD OF THE INVENTION

This invention relates to formulations of a polyolefin-based composition which is filled with halogen-free flame retardants.

BACKGROUND OF THE INVENTION

Thermoplastic polyolefin (TPO) formulations from polypropylene/propylene-based elastomer blends are commonly used in TPO for the extrusion of roofing and waterproofing membranes. In general, they are filled with 30 to 45 wt % of halogen-free flame retardants like aluminum trihydrate (ATH) or magnesium hydroxide [$Mg(OH)_2$], and have a flexural modulus in the range of 80 to 100 MPa. They pass standard fire resistance requirements as e.g. Euroclass D and E according to EN 119256-2, as well as ASTM- and EN-system tests, e.g. ENV 1187 t1 to t4. TPO formulations are in use for thicker membranes like single-ply roofing when installed on substrates, or when reduced fire resistance requirements are applicable. Until now, Euroclass A2 fire-resistance levels according to EN 11925-2, or similar demanding and vertical fire tests could not be matched with halogen-free olefin formulations. Table 1 gives an overview of the European fire standards.

ability, abrasion resistance, mechanical strength, printability, weathering- and UV-resistance, and fire resistance. To fulfill these demanding combinations of requirements, polyvinylchloride, fluoropolymers, or even silicones, are in common use today. TPOs were not used as they could not comply with the demanding property requirements. In particular, they lack flexibility in combination with sufficient fire resistance.

WO 2005/090427 describes a multi-block copolymer comprising in polymerized form ethylene and one or more copolymerizable comonomers, said copolymer containing therein two or more segments or blocks differing in comonomer content, crystallinity, density, melting point or glass transition temperature.

WO 2006/101924 describes blends of at least two polyolefins with ethylene/α-olefin (multi-block) interpolymers with improved compatibility.

WO 2006/101932 describes compositions comprising ethylene/α-olefin (multi-block) interpolymers and fillers.

WO/2011/008336 describes a multilayer structure comprising a top skin layer comprising a propylene/alpha-olefin copolymer blended with at least one other component; a middle foam layer comprising a propylene/alpha-olefin copolymer; and a bottom fabric layer comprising a nonwoven, polymeric, spunbond material.

SUMMARY

The invention provides a formulation comprising (A) olefin block copolymer, (B) propylene-α-olefin interpolymer,

TABLE 1

European Fire Standards and Classes and for Infrastructure Membranes

| | | | | | System Tests | | |
|---|---|---|---|---|---|---|---|
| Euro- | Laboratory Tests | | | Germany | | | |
| class | Small burner | SBI (EN 13823) | Other | DIN 4102 | UK | France | Nordic |
| A1 | | | EN 1182 EN 1716 | | Non-combustible | Non-combustible | Non-combustible |
| A2 | | $Figra_{0.2 MJ} =< 120$ Ws $THR_{600 s} =< 7.5$ MJ | EN 1182 EN 1716 | A2 | Non-combustible | M0/M1 | |
| B | EN 11925-2 (30 s/30 s) | $Figra_{0.2 MJ} =< 120$ Ws $THR_{600 s} =< 7.5$ MJ | BS 7837 | B1 | BS 476 part 6 and 7 B-S1-d0 | M1 | Class 1 |
| C | EN 11925-2 (30 s/30 s) | $Figra_{0.4 MJ} =< 250$ Ws $THR_{600 s} =< 15$ MJ | | B1 | Class 1 | M2 | Class 2 |
| D | EN 11925-2 (30 s/30 s) | $Figra_{0.4 MJ} =< 750$ Ws | | B2 ENV 1187 t1 | Class 3 ENV 1187 t4 | M3/M4 ENV 1187 t3 | Class 3 ENV 1187 t2 |
| E | EN 11925-2 (15 s/20 s) | | | B2 ENV 1187 t1 | | M4 | not allowed |
| F | | | | B3 | | | |

Coated fabrics for applications like architectural textiles, banners, tarpaulins or artificial leather may require higher loadings of flame retardants to pass stringent test requirements like EN 11925-2 (small burner test) according to Euroclass B or BS 7837. EN 13823 (single burning item test) is required to be passed in a classification of B-S1-dO.

Flexible, coated fabrics for applications demanding fire resistance at the level of Euroclass B are commonly made from polymers with intrinsic fire resistance like polyvinylchloride, polyurethanes, fluoroelastomers or silicones.

At the same time, compounds for such applications have to show processability in extrusion coating, and good fabric penetration and adhesion. In the final application, they usually have to fulfill various properties like flexibility (a common target is a flexibility modulus below <30 MPa), weldand (C) halogen-free flame retardant. In addition, the invention provides a layer of and a multi-layer structure, the layer made from a composition comprising (A) olefin block copolymer, (B) propylene-α-olefin interpolymer, and (C) halogen-free flame retardant.

BRIEF DESCRIPTION OF THE DRAWINGS

FIG. 1 shows examples of woven fabrics (scrim)

FIG. 2 shows the sample preparation for weld testing

FIG. 3 shows the proper pattern for cutting stripes for weld testing

FIG. 4 shows testing of weld quality: tear with pliers until sample failure

FIG. 5 shows sample failure inside the weld seam ("peal in the seam")

FIG. 6 shows an example schematic of a multi-layer structure

DETAILED DESCRIPTION

This invention provides polyolefin-based formulations comprising olefin block copolymers (OBC) and propylene-α-olefin interpolymers incorporating halogen-free flame retardants in amounts greater than 60 wt %, while still showing good processability, mechanical properties, heat weldability and excellent fire resistance. In addition, such halogen-free and non thermoset compounds show excellent recyclability. The formulations are an environmentally friendly, halogen-free, economic and high performing alternative to PVC, polyurethanes, fluoropolymers, silicones, and the like.

Such formulations may be applied to various substrates via different conventional methods. Such conventional methods include, but are not limited to, calendaring process, lamination process, extrusion process, direct extrusion process, cast sheet process, or combinations thereof.

The invention provides flexible OBC/propylene-α-olefin interpolymer formulations which have a low modulus in the range of 50 MPa, even when filled with flame retardants. Their high flexibility/low modulus makes them easy to handle during confectioning, installation and welding. OBC/propylene-α-olefin interpolymer formulations exhibit excellent filler uptake and melting properties, and have a low oligomers content, which generates good processing and welding performance.

The blends of this invention weld as well as PP-based and more rigid (>80 MPa modulus) TPOs such as commonly used for standard single-ply roofing membranes. This property allows heat-welding rigid products with soft products, e.g to weld soft profiles like standing seams to TPO single-ply, or to weld sealant lips to PP profiles. Common heat-welding devices and processes can be used. An additional advantage of OBC/propylene-α-olefin interpolymer blends is their relatively high softening/melting point which provides a high level of heat resistance.

The formulation may further comprise one or more thermoplastic polymers including, but not limited to, polypropylene, random propylene copolymer and homogeneously branched ethylene/α-olefin copolymer.

In addition, pre-mixtures from polyolefin dispersions with flame retardants, colorants and stabilizers may be used for fabric coating using methods like blade, kiss roll, size press, curtain or spray.

Definitions

"Polymer" means a compound prepared by polymerizing monomers, whether of the same or a different type. The generic term polymer thus embraces the term homopolymer, usually employed to refer to polymers prepared from only one type of monomer, and the term interpolymer as defined below.

"Interpolymer" and like terms means a polymer prepared by the polymerization of at least two different types of monomers. Interpolymer refers both to polymers prepared from two different types of monomers, and polymers prepared from more than two different types of monomers, e.g., copolymers, terpolymers, tetrapolymers, etc.

"Layer" and like terms mean a single thickness or coating of a compound, polymer or composition spread out or covering a surface.

"Multi-layer structure" and similar terms mean a structure that comprises two or more layers. The multi-layer structures of this invention comprise a bottom fabric layer and at least a top coating layer.

"Calendering" and like terms mean, in the context of this invention, a mechanical process in which a molten polymer is converted into a sheet by passing the molten polymer through a series of rollers to coalesce, flatten and smooth the polymer into a sheet or film.

"Laminating" and like terms mean a process in which a film, typically of plastic or like material, is applied to a substrate which can be another film. The film can be applied to the substrate with or without an adhesive. If without an adhesive, the film and/or substrate can be heated to effect heat or melt lamination. Laminations are products of a laminating process, and these products are multilayered, i.e., they comprise at least two layers, a film layer in contact with a base or substrate layer.

"Nonwoven fabric" and like terms mean a fabric or like material that is made from long fibers, bonded together by chemical, mechanical, heat or solvent treatment. The term is used to denote fabrics, like felt, than are neither woven nor knitted.

"Spunbond fabric" and like terms mean a fabric or like material that is made by depositing extruded, spun filaments onto a collecting belt in a uniform, random manner followed by bonding of the fibers.

"Woven fabrics", or fabrics with knitted weaves, are commonly used for flexible membranes. See illustrative examples in FIG. 1.

The term "polypropylene" includes homopolymers of propylene such as isotactic polypropylene, syndiotactic polypropylene, and copolymers of propylene and one or more $C_{2, 4-8}$ α-olefins in which propylene comprises at least 50 mole percent.

The term "crystalline" refers to a polymer or polymer block that possesses a first order transition or crystalline melting point (Tm) as determined by differential scanning calorimetry (DSC) or equivalent technique. The term may be used interchangeably with the term "semicrystalline".

Olefin Block Copolymer (OBC)

The term "olefin block copolymer" or "OBC" means an ethylene/α-olefin multi-block copolymer and includes ethylene and one or more copolymerizable α-olefin comonomer in polymerized form, characterized by multiple blocks or segments of two or more polymerized monomer units differing in chemical or physical properties. The terms "interpolymer" and "copolymer" are used interchangeably herein. In some embodiments, the multi-block copolymer can be represented by the following formula:

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an α-olefin having 3 or more carbon atoms. For many ethylene/octene block copolymers, the preferred composition comprises an ethylene content greater than 80 mole percent of the whole polymer and an octene content of from 10 to 15, preferably from 15 to 20 mole percent of the whole polymer.

The olefin block copolymer includes various amounts of "hard" and "soft" segments. "Hard" segments are blocks of polymerized units in which ethylene is present in an amount greater than 95 weight percent, or greater than 98 weight percent based on the weight of the polymer. In other words, the comonomer content (content of monomers other than ethylene) in the hard segments is less than 5 weight percent, or less than 2 weight percent based on the weight of the polymer. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, greater than 10 weight percent, or greater than 15 weight percent based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent.

The soft segments can be present in an OBC from 1 weight percent to 99 weight percent of the total weight of the OBC, or from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the OBC. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Inter-polymers," filed on Mar. 15, 2006, in the name of Colin L. P. Shan, Lonnie Hazlitt, et. al. and assigned to Dow Global Technologies Inc., the disclosure of which is incorporated by reference herein in its entirety. In particular, hard and soft segment weight percentages and comonomer content may be determined as described in Column 57 to Column 63 of U.S. Pat. No. 7,608,668.

The olefin block copolymer is a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), region-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present OBC is characterized by unique distributions of both polymer polydispersity (PDI or Mw/Mn or MWD), block length distribution, and/or block number distribution, due, in an embodiment, to the effect of the shuttling agent(s) in combination with multiple catalysts used in their preparation.

In an embodiment, the OBC is produced in a continuous process and possesses a polydispersity index, PDI, from 1.7 to 3.5, or from 1.8 to 3, or from 1.8 to 2.5, or from 1.8 to 2.2. When produced in a batch or semi-batch process, the OBC possesses PDI from 1.0 to 3.5, or from 1.3 to 3, or from 1.4 to 2.5, or from 1.4 to 2.

In addition, the olefin block copolymer possesses a PDI fitting a Schultz-Flory distribution rather than a Poisson distribution. The present OBC has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present olefin block copolymer possesses a most probable distribution of block lengths. In an embodiment, the olefin block copolymer is defined as having:
a) Mw/Mn from 1.7 to 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2, \text{ and/or}$$

b) Mw/Mn from 1.7 to 3.5, and is characterized by a heat of fusion, $\Delta H$ in J/g, and a delta quantity, $\Delta T$, in degrees Celsius defined as the temperature difference between the tallest DSC peak and the tallest Crystallization Analysis Fractionation ("CRYSTAF") peak, wherein the numerical values of $\Delta T$ and $\Delta H$ have the following relationships:

$$\Delta T > -0.1299 \Delta H + 62.81 \text{ for } \Delta H \text{ greater than zero and up to 130 J/g}$$

$$\Delta T \geq 48° \text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or
c) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of cross-linked phase:

$$Re > 1481 - 1629(d); \text{ and/or}$$

d) has a molecular fraction which elutes between 40° C. and 130° C. when fractionated using TREF, characterized in that the fraction has a molar comonomer content greater than, or equal to, the quantity $(-0.2013)T + 20.07$, more preferably greater than or equal to the quantity $(-0.2013)T + 21.07$, where T is the numerical value of the peak elution temperature of the TREF fraction, measured in ° C.; and/or, e) has a storage modulus at 25° C., G' (25° C.), and a storage modulus at 100° C., G'(100° C.), wherein the ratio of G' (25° C.) to G' (100° C.) is in the range of 1:1 to 9:1.

The olefin block copolymer may also have:

f) a molecular fraction which elutes between 40° C. and 130° C. when fractionated using TREF, characterized in that the fraction has a block index of at least 0.5 and up to 1 and a molecular weight distribution, Mw/Mn, greater than 1.3; and/or g) average block index greater than zero and up to 1.0 and a molecular weight distribution, Mw/Mn greater than 1.3. It is understood that the olefin block copolymer may have one, some, all, or any combination of properties (A)-(G). Block Index can be determined as described in detail in U.S. Pat. No. 7,608,668 herein incorporated by reference for that purpose. Analytical methods for determining properties (A) through (G) are disclosed in, for example, U.S. Pat. No. 7,608,668, Col. 31, line 26 through Col. 35, line 44, which is herein incorporated by reference for that purpose.

Suitable monomers for use in preparing the present OBC include ethylene and one or more addition polymerizable monomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

The olefin block copolymer has a density of from 0.850 g/cc to 0.925 g/cc, or from 0.860 g/cc to 0.88 g/cc or from 0.860 g/cc to 0.879 g/cc. The OBC has a Shore A value of 40 to 70, preferably from 45 to 65 and more preferably from 50 to 65. In an embodiment, the olefin block copolymer has a melt index (MI) from 0.1 g/10 min to 30 g/10, or from 0.1 g/10 min to 20 g/10 min, or from 0.1 g/10 min to 15 g/10 min, as measured by ASTM D 1238 (190° C./2.16 kg). The olefin block copolymer is present in an amount of 5 wt % to 45 wt %, preferably 10 wt % to 30 wt %, more preferably 10 wt % to 25 wt %. The composition may comprise more than olefin block copolymer.

The olefin block copolymers are produced via a chain shuttling process such as described in U.S. Pat. No. 7,858,706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. Col 51, line 29 through Col. 54, line 56. The process is also described, for example, in the following: U.S. Pat. Nos. 7,608,668; 7,893,166; and 7,947,793.

Propylene-α-Olefin Interpolymer

The propylene-alpha-olefin interpolymer is characterized as having substantially isotactic propylene sequences. The propylene-alpha-olefin interpolymers include propylene-based elastomers (PBE). "Substantially isotactic propylene sequences" means that the sequences have an isotactic triad (mm) measured by $^{13}$C NMR of greater than 0.85; in the alternative, greater than 0.90; in another alternative, greater than 0.92; and in another alternative, greater than 0.93. Isotactic triads are well-known in the art and are described in, for example, U.S. Pat. No. 5,504,172 and International Publication No. WO 00/01745, which refers to the isotactic sequence in terms of a triad unit in the copolymer molecular chain determined by $^{13}$C NMR spectra.

The propylene/alpha-olefin interpolymer may have a melt flow rate in the range of from 0.1 to 500 grams per 10 minutes (g/10 min), measured in accordance with ASTM D-1238 (at 230° C./2.16 Kg). All individual values and subranges from 0.1 to 500 g/10 min are included herein and disclosed herein; for example, the melt flow rate can be from a lower limit of 0.1 g/10 min, 0.2 g/10 min, or 0.5 g/10 min to an upper limit of 500 g/10 min, 200 g/10 min, 100 g/10 min, or 25 g/10 min. For example, the propylene/alpha-olefin copolymer may have a melt flow rate in the range of from 0.1 to 200 g/10 min; or in the alternative, the propylene/alpha-olefin copolymer may have a melt flow rate in the range of from 0.2 to 100 g/10 min; or in the alternative, the propylene/alpha-olefin copolymer may have a melt flow rate in the range of from 0.2 to 50 g/10 min; or in the alternative, the propylene/alpha-olefin copolymer may have a melt flow rate in the range of from 0.5 to 50 g/10 min; or in the alternative, the propylene/alpha-olefin copolymer may have a melt flow rate in the range of from 1 to 50 g/10 min; or in the alternative, the propylene/alpha-olefin copolymer may have a melt flow rate in the range of from 1 to 40 g/10 min; or in the alternative, the propylene/alpha-olefin interpolymer may have a melt flow rate in the range of from 1 to 30 g/10 min.

The propylene/alpha-olefin interpolymer has crystallinity in the range of from at least 1 percent by weight (a heat of fusion (Hf) of at least 2 Joules/gram (J/g)) to 30 percent by weight (a Hf of less than 50 J/g). All individual values and subranges from 1 percent by weight (a Hf of at least 2 J/g) to 30 percent by weight (a Hf of less than 50 J/g) are included herein and disclosed herein; for example, the crystallinity can be from a lower limit of 1 percent by weight (a Hf of at least 2 J/g), 2.5 percent (a Hf of at least 4 J/g), or 3 percent (a Hf of at least 5 J/g) to an upper limit of 30 percent by weight (a Hf of less than 50 J/g), 24 percent by weight (a Hf of less than 40 J/g), 15 percent by weight (a Hf of less than 24.8 J/g) or 7 percent by weight (a Hf of less than 11 J/g). For example, the propylene/alpha-olefin copolymer may have a crystallinity in the range of from at least 1 percent by weight (a Hf of at least 2 J/g) to 24 percent by weight (a Hf of less than 40 J/g); or in the alternative, the propylene/alpha-olefin copolymer may have a crystallinity in the range of from at least 1 percent by weight (a Hf of at least 2 J/g to 15 percent by weight (a Hf of less than 24.8 J/g); or in the alternative, the propylene/alpha-olefin copolymer may have a crystallinity in the range of from at least 1 percent by weight (a Hf of at least 2 J/g) to 7 percent by weight (a Hf of less than 11 J/g); or in the alternative, the propylene/alpha-olefin copolymer may have a crystallinity in the range of Hf of less than 8.3 J/g). The crystallinity is measured by differential scanning calorimetry (DSC) as described in U.S. Pat. No. 7,199,203. The propylene/alpha-olefin copolymer comprises units derived from propylene and polymeric units derived from one or more alpha-olefin comonomers. Exemplary comonomers utilized to manufacture the propylene/alpha-olefin copolymer are $C_2$ and $C_4$ to $C_{10}$ alpha-olefins; for example, $C_2$, $C_4$, $C_6$ and $C_8$ alpha-olefins.

The propylene/alpha-olefin interpolymer comprises from 1 to 40 percent by weight of one or more alpha-olefin comonomers. All individual values and subranges from 1 to 40 weight percent are included herein and disclosed herein; for example, the comonomer content can be from a lower limit of 1 weight percent, 3 weight percent, 4 weight percent, 5 weight percent, 7 weight percent, or 9 weight percent to an upper limit of 40 weight percent, 35 weight percent, 30 weight percent, 27 weight percent, 20 weight percent, 15 weight percent, 12 weight percent, or 9 weight percent. For example, the propylene/alpha-olefin copolymer comprises from 1 to 35 percent by weight of one or more alpha-olefin comonomers; or in the alternative, the propylene/alpha-olefin copolymer comprises from 1 to 30 percent by weight of one or more alpha-olefin comonomers; or in the alternative, the propylene/alpha-olefin copolymer comprises from 3 to 27 percent by weight of one or more alpha-olefin comonomers; or in the alternative, the propylene/alpha-olefin copolymer comprises from 3 to 20 percent by weight of one or more alpha-olefin comonomers; or in the alternative, the propylene/alpha-olefin copolymer comprises from 3 to 15 percent by weight of one or more alpha-olefin comonomers.

The propylene/alpha-olefin interpolymer has a density of typically less than 0.895 g/cm$^3$; or in the alternative, less than 0.890 g/cm$^3$; or in the alternative, less than 0.880 g/cm$^3$; or in the alternative, less than 0.870 g/cm$^3$. The propylene/alpha-olefin interpolymer has a density of typically greater than 0.855 g/cm$^3$; or in the alternative, greater than 0.860 g/cm$^3$; or in the alternative, greater than 0.865 g/cm$^3$.

The propylene/alpha-olefin interpolymer has a melting temperature (Tm) typically of less than 120° C.; or in the alternative, <100° C.; or in the alternative, <90° C.; or in the alternative, <80° C.; or in the alternative, <70° C.; and a heat of fusion (Hf) typically of less than 70 Joules per gram (J/g) as measured by differential scanning calorimetry (DSC) as described in U.S. Pat. No. 7,199,203.

The propylene/alpha-olefin interpolymer has a molecular weight distribution (MWD), defined as weight average molecular weight divided by number average molecular weight ($M_w/M_n$) of 3.5 or less; or 3.0 or less; or from 1.8 to 3.0.

Such propylene/alpha-olefin interpolymers are further described in the U.S. Pat. Nos. 6,960,635 and 6,525,157. Such propylene/alpha-olefin interpolymers are commercially available from The Dow Chemical Company, under the trade name VERSIFY, or from ExxonMobil Chemical Company, under the trade name VISTAMAXX.

In one embodiment, the propylene/alpha-olefin interpolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a $C_{4-10}$ α-olefin; and containing an average of at least 0.001, preferably an average of at least 0.005 and more preferably an average of at least 0.01, long chain branches/1000 total carbons. The maximum number of long chain branches in the propylene/alpha-olefin copolymer is not critical, but typically it does not exceed 3 long chain branches/1000 total carbons. The term long chain branch, as used herein with regard to propylene/alpha-olefin copolymers, refers to a chain length of at least one (1) carbon more than a short chain branch, and short chain branch, as used herein with regard to propylene/alpha-olefin copolymers, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. Such propylene/alpha-olefin copolymers are further described in details in the U.S. Patent Publication No. 2010-0285253 and International Patent Publication No. WO 2009/067337.

Random Polypropylene Copolymer

The random propylene polymers typically comprise 90 or more mole percent units derived from propylene. The remainder of the units in the propylene copolymer is derived from units of at least one α-olefin. In the context of this invention, random polypropylene copolymers are not propylene/alpha-olefin interpolymers.

The α-olefin component of the propylene copolymer is preferably ethylene (considered an α-olefin for purposes of this invention) or a $C_{4-20}$ linear, branched or cyclic α-olefin. Examples of $C_{4-20}$ α-olefins include 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, etc.) are α-olefins for purposes of this invention. Illustrative random propylene copolymers include but are not limited to propylene/ethylene, propylene/1-butene, propylene/1-hexene, propylene/1-octene, and the like. Illustrative terpolymers include ethylene/propylene/1-octene, ethylene/propylene/1-butene, and ethylene/propylene/diene monomer (EPDM).

In one embodiment the random polypropylene copolymer has a melting temperature ($T_m$) as determined by differential scanning calorimetry (DSC) that is greater than the $T_m$ of the propylene/alpha-olefin copolymer. One acceptable DSC procedure for determining the melting temperature of the random polypropylene copolymer and propylene/alpha-olefin copolymer is that described in U.S. Pat. No. 7,199,203. In one embodiment the random polypropylene copolymer has a Tm greater than 120° C., and/or a heat of fusion greater than 70 J/g (both measured by DSC) and preferably, but not necessarily, made via Ziegler-Natta catalysis.

Polypropylene Homopolymer

The polypropylene polymer component may be propylene homopolymer. There is no particular limitation on the method for preparing the propylene polymer. However, in general, the polymer is obtained by homopolymerization of propylene in a single stage or multiple-stage reactor. Polymerization methods include high pressure, slurry, gas, bulk, or solution phase, or a combination thereof, using a traditional Ziegler-Natta catalyst or a single-site, metallocene catalyst system. The catalyst used is preferably one which has a high isospecificity. Polymerization may be carried out by a continuous or batch process and may include use of chain transfer agents, scavengers, or other such additives as deemed applicable.

Homogeneously Branched Ethylene/Alpha-Olefin Copolymer

The homogeneously branched ethylene/alpha-olefin copolymers useful in the practice of this invention can be made with a single-site catalyst such as a metallocene catalyst or constrained geometry catalyst, and typically have a melting point of less than 105, preferably less than 90, more preferably less than 85, even more preferably less than 80 and still more preferably less than 75° C. The melting point is measured by differential scanning calorimetry (DSC) as described, for example, in U.S. Pat. No. 5,783,638. Such ethylene/α-olefin copolymers with a low melting point often exhibit desirable flexibility and thermoplastic properties useful in the fabrication of the multi-layer structures of this invention.

The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, are α-olefins and can be used in place of some or all of the α-olefins described above. Similarly, styrene and its related olefins (for example, α-methylstyrene, etc.) are α-olefins for purposes of this invention. Illustrative homogeneously branched ethylene/alpha-olefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/propylene/styrene. The copolymers can be random or blocky.

More specific examples of homogeneously branched ethylene/alpha-olefin interpolymers useful in this invention include homogeneously branched, linear ethylene/α-olefin copolymers (e.g. TAFMER® by Mitsui Petrochemicals Company Limited and EXACT® by Exxon Chemical Company), and the homogeneously branched, substantially linear ethylene/α-olefin polymers (e.g., AFFINITY™ and ENGAGE™ polyethylene available from The Dow Chemical Company). The substantially linear ethylene copolymers are especially preferred, and are more fully described in U.S. Pat. Nos. 5,272,236, 5,278,272 and 5,986,028. Blends of any of these interpolymers can also be used in the practice of this invention. In the context of this invention, homogeneously branched ethylene/alpha-olefin interpolymers are not olefin block copolymers.

Filler—Halogen-Free Flame Retardant

A halogen-free flame retardant is used in the formulations to impart flame-resistant properties. By 'halogen-free' is meant that the flame-retardant molecules do not contain halogen atoms, as commonly understood in the chemical art. The flame-retardant filled polymer formulations provided herein are able to maintain desirable fabrication characteristics with high filler levels. The attainment of filler loadings of approximately 50 percent by volume, and above, while maintaining adequate mechanical properties is favorable to the formulation of economical compositions. Further, the compositions provided herein, in certain embodiments, can maintain desirable mechanical properties over a wide range of filler levels.

Fillers which are useful in the compositions include, but are not limited to alumina, magnesium oxide, aluminum hydroxide, magnesium hydroxide, polyphosphates, hindered amines, glass fibers, nano-clays, zinc oxide, aluminum silicate, calcium silicate, titanium dioxide, titanates, glass microspheres and chalk. Particularly preferred compounds are aluminum-trihydrate or magnesium hydroxide. In certain embodiments, the filler is selected from calcium carbonate and barium sulfate. Ignition resistant fillers which can be used in the compositions include antimony oxide, alumina trihydrate, magnesium hydroxide, and borates. The amount of the filler depends upon the filler density; the higher the filler density, the more of it which can be added to the formulation without appreciably affecting the volume fraction of that filler. The level of filler in a blend composition may be described by weight or volume. The volume percent of the filler may be estimated by the equation:

$$\text{vol }\%F=[(\text{wt }\%\,F/\rho F)\times 100\%]/[(\text{wt }\%F/\rho F)+\Sigma(\text{wt }\%\,i/\rho i)]$$

Where vol % F is equal to the volume percent of the filler in the final composition, wt % F is equal to the weight 5 percent of the filler; ρF is the density of the filler measured in grams per cubic centimeter (g/cm3); wt % i is the weight percent of the ith component; ρi is the density of the ith component measured in grams per cubic centimeter (g/cm3).

Accordingly, the level of the filler is discussed herein in terms of weight percent filler, based on the total weight of the composition. Particle size of the filler has some effect on the amount of filler used in the compositions. Fine particle size fillers generally have a tendency to result in higher blend viscosities but to provide improved physical strength. They are also more expensive. The use of fine filler, especially at high filler loading, results in a smoother extrudate surface when molten blend is extruded through a die orifice. The attendant benefits of using fine particle size filler in filled polymer compositions are described in U.S. Pat. No. 4,263,196, the disclosure of which is, hereby incorporated by reference, in its entirety. In the exemplary compositions provided herein, Magnesium hydroxide used has a particle size between about 0.65 micron and 0.95 microns.

In certain embodiments, the use of many types of fillers or combination thereof is possible without altering the properties of the filled polymer compositions. For example, inclusion of aluminum trihydrate (ATH, $Al_2O_3.3H_2O$) or magnesium hydroxide ($Mg(OH)_2$) is highly desirable when flame-retardant or low-smoke-tendency compositions are desired. Finally, fillers with varied aspect ratios, such as talc, mica, from highly acicular (wollastonite, for example) to round (glass beads, for example) can also be employed to alter relationships such as tensile strength or elongation. The filler is present in an amount ranging from 30% up to 95% by total weight of the filled polymer compositions provided herein. In certain embodiments, the filler is present in an amount ranging from 40% up to 90%, from 45% up to 85%, from 50% up to 85%, from 60% up to 81% by total weight of the composition.

Additives

A variety of additional additives may be used in the formulations of this invention. The additives include, but are not limited to, antioxidants; surface tension modifiers; anti-block agents; plasticizers; processing oils, crosslinking agents, dispersants, blowing agents, UV stabilizers, antimicrobial agents such as organometallics, isothiazolones, organosulfurs and mercaptans; antioxidants such as phenolics, secondary amines, phosphites and thioesters; antistatic agents such as quaternary ammonium compounds, amines, and ethoxylated, propoxylated or glycerol compounds; hydrolytic stabilizers; lubricants such as fatty acids, fatty alcohols, esters, fatty amides, metallic stearates, paraffinic and microcrystalline waxes, silicones and orthophosphoric acid esters; acid neutralizers or halogen scavengers such as zinc oxide; mold release agents such as fine-particle or powdered solids, soaps, waxes, silicones, polyglycols and complex esters such as trimethylol propane tristearate or pentaerythritol tetrastearate; pigments, dyes and colorants; heat stabilizers such as organotin mercaptides, an octyl ester of thioglycolic acid and a barium or cadmium carboxylate; ultraviolet light stabilizers such as a hindered amine, an o-hydroxy-phenylbenzotriazole, a 2-hydroxy-4-alkoxybenzophenone, a salicylate, a cyanoacrylate, a nickel chelate and a benzylidene malonate and oxalanilide; acid-scavengers; and zeolites, molecular sieves and other known deodorizers.

Other additives include scratch/mar additives, such as polydimethyl siloxane (PDMS), or functionalized polydimethyl siloxane, or IRGASURF® SR 100 (available from Ciba Specialty Chemicals), or scratch mar formulations containing erucamide. Functionalized polydimethyl siloxanes include, but are not limited to, hydroxyl functionalized polydimethyl siloxane, amine functionalized polydimethyl siloxane, vinyl functionalized polydimethyl siloxane, aryl functionalized polydimethyl siloxane, alkyl functionalized polydimethyl siloxane, carboxyl functionalized polydimethyl siloxane, mercaptan functionalized polydimethyl siloxane, and derivatives of the same. One skilled in the art can readily determine quantities of additives needed based on the application involved.

Antioxidants and antiozonants additives for use in the invention include hindered phenols, bisphenols, and thiobisphenols; substituted hydroquinones; tris(alkylphenyl) phosphites; dialkylthiodipropionates; phenylnaphthylamines; substituted diphenylamines; dialkyl, alkyl aryl, and diaryl substituted p-phenylene diamines; monomeric and polymeric dihydroquinolines; 2-(4-hydroxy-3,5-t-butylaniline)-4,6-bis(octylthio)1,3,5-triazine, hexahydro-1,3,5-tris-β-(3,5-di-t-butyl-4-hydroxyphenyl)propionyl-s-triazine, 2,4,6-tris(n-1,4-dimethylpentylpphenylene-diamino)-1,3,5-triazine, tris-(3,5-di-t-butyl-4-hydroxybenzyl)isocyanurate, nickel dibutyldithiocarbamate, 2-mercaptotolylimidazole and its zinc salt, petroleum waxes, and the like.

Additives can be used in amounts ranging from 0.01 wt % or less to 10 wt % or more based on the weight of the composition.

The formulation may further comprise one or more thermoplastic polymers including, but not limited to, functional grades of polyolefins, either grafted or copolymers, with moities such as maleic acid esters, acrylic and methacrylic acid esters, vinyl acetate, or as ionomers. Functional groups tend to increase filler acceptance and may further increase fire resistance.

In order to feed high concentrated additives to the final composition some additives may be pre-compounded with polyolefin matrix as a binder. For certain examples, additional $TiO_2$ is added to existing compounds via a 50 wt % masterbatch in a 40 wt % low-viscosity PP carrier.

The formulations can have a specific Organic/Inorganic Ratio. This is defined as: polymer(s)+organic additives (A/O, UV, etc.) divided by $TiO_2$+inorganic filler, all by weight %. The terms "organic" and "inorganic" have meanings as understood by one of skill in the art. The $TiO_2$ has no performance as flame retardant (does not release water), but neither does it contribute to the fuel load of the formulations, thus it can make a difference in fire resistance. The organic/inorganic ratio is preferably less than 0.35 and may also be 0.200 to 0.340, 0.220 to 0.330 or 0.230 to 0.320.

The formulations can also have a Polymer/Flame Retardant Ratio. This is defined as polymer(s)+organic additives (A/O, UV, etc.) divided by inorganic filler (not including $TiO_2$, all by weight %) The halogen-free flame retardant does not contribute to the fuel load, and it releases water above its decomposition point, (270° C. for $Mg(OH)_2$). The polymer/flame retardant ratio is preferably less than 0.35 and may also be 0.20 to 0.34, 0.22 to 0.33 or 0.23 to 0.32.

Dispersion

An alternative method of preparing a fire resistant coating on a nonwoven or fabric substrate is to use a polyolefin dispersion as the polymer matrix. Polyolefin dispersions can be prepared by the process of melt kneading product of one or more thermoplastic polymers and one or more stabilizing agents in the presence of water and one or more neutralizing agents, wherein the aqueous dispersion has an average volume particle size in the range of from 0.05 to 5 µm, a pH in the range of from 8 to 11, a total solid content in the range of from 35 to 65 percent by weight of one or more thermoplastic polymers and one or more stabilizing agents, and/or from 35 to 65 percent by weight of water based on the weight of the aqueous dispersion. The method for producing the aqueous dispersion comprises the steps of (1) melt kneading one or more thermoplastic polymers and one or more stabilizing agents in the presence of water and one or more neutralizing agents to form an emulsified mixture; (2) further diluting said emulsified mixture with additional water while, optionally, further removing heat from said emulsified mixture; (3) thereby forming solid polymeric particles dispersed in water; (4) thereby producing said aqueous dispersion. The initial water to content to form the emulsified mixture is typically less than 5 percent; for example, from 1 to 3 percent, by weight of water based on the weight of emulsified mixture. The further dilution step increase the water content of the dispersion to a range from 35 to 65 percent by weight of water based on the weight of the dispersion. The polymers described in the present patent application can be converted into stable water-based dispersions by the mechanical dispersion processes described in U.S. Pat. Nos. 7,803,865, 7,763, 676 & 7,935,755, to the extent that they describe the process for such dispersions. These are typically manufactured at solids in the range of 40 to 60% with a pH in the range of 8 to 11. They can be used with a wide range of the additives used to formulate liquid coatings. These ingredients include but are not limited to thickeners, dispersants, wetting agents, solvents, fillers, pigments, colorants, UV stabilizers, defoamers, and fire retardant additives such as magnesium hydroxide. The formulated coating including the polymer dispersion and flame retardant can be applied to a nonwoven or woven fabric by several coating methods including blade, kiss roll, size press, curtain or spray. The excess water is then removed in a drying process (heated air by convection and/or combined with infra-red heaters) and the coated item is recovered. The coated item can be further treated to enhance performance and adapt the final item for different applications (primer for printability for example). In general, the drying temperatures required are slightly above the melting point of the polymer used in the polyolefin dispersion. This enables the use of fibers in the nonwoven or woven fabric that have lower heat resistance. Thus polypropylene fibers can be used with water-based coatings of polyolefin dispersions whereas polyester fibers would be preferred for systems where the coating is applied by melt extrusion or calendaring.

Fabric Layer (Substrate)

The formulation can be used on a substrate of a fabric layer comprising a polymeric material which can be woven, nonwoven, knitted, plained, spunbond, etc., and it can comprise natural and/or synthetic fiber. In one embodiment, the fabric layer is a nonwoven, polymeric, spunbond material of a weight of 50-500, more typically of 150-400 and even more typically of 200-350, grams per square meter ($g/m^2$). Fabrics that can be used in the practice of this invention include, but are not limited to, cotton, silk and various synthetics based on polyolefins (e.g., polyethylene, polypropylene, etc.), polyamide, polyester, polyurethane (e.g., a spandex material), glass fibers, aramide or carbon fibers, metal fibers and the like. In one embodiment, the preferred fabric is prepared from polyester, polyethylene or polypropylene. The fabric can be subjected to a pre-lamination treatment, e.g., corona surface treatment, impregnation, etc., or not, and the foam or top skin layer is ultimately heat laminated to it.

"Calendering" and like terms mean, in the context of this invention, a mechanical process in which a molten polymer is converted into a sheet by passing the molten polymer through a series of rollers to coalesce, flatten and smooth the polymer into a sheet or film. "Laminating" and like terms mean a process in which a film, typically of plastic or like material, is applied to a substrate which can be another film. The film can be applied to the substrate with or without an adhesive. If without an adhesive, the film and/or substrate can be heated to effect heat or melt lamination. Laminations are products of a laminating process, and these products are multilayered, i.e., they comprise at least two layers, a film layer in contact with a base or substrate layer.

Multi-layer structures comprising the formulation can be manufactured, for example, using the same conventional calendaring and lamination processes used for PVC-based artificial leather. Propylene-ethylene based resins can easily be used in this process because their stickiness against the roll surface is little as compared to other ethylene/propylene-based copolymers. The glass transition temperature of propylene-ethylene copolymer is relatively higher than that of ethylene alpha-olefin copolymer which has high elastic modulus and stickiness. Moreover, its melt tension lends itself well to lamination, embossing, and take-off.

One of the important factors in the calendaring process is to optimize the roll-banking condition, a condition well known to those skilled in the art. This is indicative of good melt-mixing of the resins. Usually high melt-tension requires a high molecular weight resin, but high molecular weight resins are not easily melted in roll mixing. For good banking conditions, a balance is needed between the melt-tension and melt-fusion.

Printing/Coating

The multi-layer articles may be printed on. Surface activation can be achieved by various means well known to one skilled in the art, such as corona, plasma, or flame-treating, or by fluorination to generate membrane surfaces with sufficient activation energy. Afterwards, printing is done with state of the art printing inks and processes.

Methods

Density is measured according to ASTM D 792-03, Method B, in isopropanol.

Melt Index—ASTM 1238, 2.16 kg@190° C. ($I_2$); ISO 1133, 2.16 kg@190° C.; ISO 1133, 5 kg@190° C.

Melt Flow Rate—ASTM 1238, 2.16 kg@230° C.; 2.16 kg@230° C.; ISO 1133, 5 kg@190° C.

GPC method—The gel permeation chromatographic system can be instruments such as a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute. Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. Sci., Polym. Let., 6, 621 (1968)):

$$M_{polyethylene}=0.431(M_{polystyrene}), \text{ or}$$
$$M_{polypropylene}=0.645(M_{polystyrene})$$

Polyethylene equivalent molecular weight calculations are performed using Viscotek TriSEC software Version 3.0.

Polydispersity (PDI) or Molecular Weight Distribution (MWD)—the polydispersity of the polymers used in this invention is typically described as "narrow". "Narrow polydisperity", "narrow molecular weight distribution", "narrow MWD" and similar terms mean a ratio ($M_w/M_n$) of weight average molecular weight ($M_w$) to number average molecular weight ($M_n$) as measured by GPC.

Differential Scanning calorimetry results are determined using a TAI model Q1000 DSC equipped with an RCS cooling accessory and an auto-sampler. A nitrogen purge gas flow of 50 ml/min is used. The sample is pressed into a thin film and melted in the press at about 175° C., then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak, or melting temperature (Tm), is measured as the maximum in heat flow rate (W/g) with respect to the linear baseline drawn between −30° C. and end of melting. The heat of fusion ($\Delta Hf$) is measured as the area under the melting curve between −30° C. and the end of melting using a linear baseline. Calibration of the DSC is done as follows. First, a baseline is obtained by running a DSC from −90° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C. per minute. The heat of fusion and the onset of melting of the indium sample are determined and checked to be within 0.5° C. from 156.6° C. for the onset of melting and within 0.5 J/g from 28.71 J/g for the of fusion. Then deionized water is analyzed by cooling a small drop of fresh sample in the DSC pan from 25° C. to −30° C. at a cooling rate of 10° C. per minute. The sample is kept isothermally at −30° C. for 2 minutes and heat to 30° C. at a heating rate of 10° C. per minute. The onset of melting is determined and checked to be within 0.5° C. from 0° C.

Crystallinity—The factor that is used to convert specific heat of fusion, $\Delta Hf$, into nominal weight % crystallinity is 165 J/g (for propylene-based polymers) and 292 J/g (for ethylene-based polymers)=100 weight % crystallinity. (Use of a different conversion factor could change details of the results but not substantive conclusions.) With this conversion factor, the total crystallinity of a sample (units: weight % crystallinity) is calculated as 100% times ΔHf divided by either 165 or 292 J/g. And, with this conversion factor, 1% residual crystallinity corresponds to 1.65 J/g (P-based) or 2.92 J/g (E-based).

Tensile Strength—EN ISO 527-1 at 100 mm/min

Modulus—ISO 527-3, 2% secant modulus

Elongation—EN ISO 527-1 at 100 mm/min

Weld test—Welding of polymers describes the process of combining (bonding) material surfaces under pressure and temperature, usually requiring full or partial melting of components to combine. Welding of polymers requires compatibility of material pairs for combination. The herein described heat sealing is a kind of welding. Heating sources for welding or sealing can be provided by hot air, heat conduction, infrared irradiation, mechanical friction, ultra sonic exposure, or high frequency. Heat welding systems, for example, hand held systems like TRIAC-S from LEISTER (Switzerland), are in common use for the welding of building and construction membranes. For thermoplastic olefins, set temperatures in the range of 280 to 400° C. are taken for heat welding. The common test method for olefins is to clean the sample surfaces with acetone and then weld the samples over a width of 5 cm. Sample stripes of "1.5 cm width by 150 mm length" were cut perpendicular to the weld seam, and over the seam (joined membranes—overlapping stream in middle of strip). After 24 hours of storage at ambient conditions, tensile/tear tests over the welded stripes were performed. The requirement in building and construction is thereby, that failure of the sample has to occur in the sheet area, and not in the welding seam. Peeling of the seam is not tolerated. Figures illustrating various aspects of the testing are shown in FIG. 2-FIG. 5.

Flammability—EN11925-2; BS 7837; EN 13823

EXAMPLES hopper and ending with a flange setting of 210° C. In principal, any standard direct extrusion, extrusion or melt calendaring process for olefins may be used to provide a homogeneous melt for shaping or fabric coating.

Following the extruder, the melt is shaped at mass temperatures in the range of 210° C. to 240° C. through a flat slit die and fed into a three roll calendar. In the nip of the first calendar gap, the melt is coated on a knitted, heavy duty scrim.

The specific data of the scrim are: 3.5×3.5 round stitch; 2200 PET×2200 PET; 165 g/m$^2$; warp tensile: 260 daN/5 cm, weft tensile: 260 daN/5 cm.

In principal, any scrim with sufficient mechanical and dimensional strength to cope with the end-use requirements, and with sufficient adhesion with the polymer layers may be used. Also scrims from carbon fibers, glass fibers, PP or PE, or even metal may be used.

This extrusion coating can be done in separate steps, according to the desired end-product design. For the examples:

Step 1: Extrusion of the bottom layer. First pass coating of the scrim.

Step 2: Extrusion of the top layer, second pass and final coating.

As needed, additional layers may be extruded or co-laminated, like block-out layers, colored top layers etc.

For the Examples, the total thickness of the membranes is between 0.55 and 0.65 mm.

The resulting membrane design is outlined in FIG. 6.

The physical properties of the coated membranes were then determined according to EN ISO 527-1 on a tensile tester. Tensile strength and break elongation were measured under a drawing speed of 100 mm/min. The secant modulus was determined at the beginning of the tensile test at 2% elongation (2% secant modulus).

In addition, heat-welded samples were prepared with a handheld Leister Triac system according to FIG. 2-FIG. 5.

TABLE 2

Description of materials

| Material | Description |
|---|---|
| OBC | INFUSE ™ 9100 - Density 0.877 g/cc, 1.0 I$_2$ g/10 min (ASTM D-1238; 2.16 kg @ 190° C.) - from The Dow Chemical Company |
| propylene/α-olefin copolymer | VERSIFY ™ 4200 - Density 0.876 g/cc, 25 MFR g/10 min (ASTM D-1238; 2.16 kg @ 230° C.), crystallinity 29 wt %, Tm 84° C. - from The Dow Chemical Company |
| Carrier | Low flow PP as carrier for additives |
| Anti-oxidant | IRGANOX ® B225 - 50/50 blend of IRGAFOS 168 (Tris(2,4-di-tert-butylphenyl) phosphite) & IRGANOX 1010 hindered phenolic (Pentaerythritol Tetrakis[3-[3,5-di-tert-butyl-4-hydroxyphenyl]propionate]) from Ciba, now part of BASF |
| Hindered amine light stabilizer (HALS) | CHIMASSORB ™ 2020 - from Ciba, now part of BASF 1,6-Hexanediamine,N,N'-bis(2,2,6,6-tetramethyl-4-piperidinyl)-polymer with 2,4,6-trichloro-1,3,5-triazine, reaction products with N-butyl-1-butanamide an N-butyl-2,2,6,6-tetramethyl-4-piperidinzmine |
| Colorant | TiO$_2$ _ KRONOS ™ 2220 - from Kronos |
| Mg(OH)$_2$ | MAGNIFIN ™ H10MV - from Albemarle/Martinswerk |

Samples from these compounds are produced using an internal kneader. In principal, any standard discontinuous or continuous compounding process may be used for the preparation of the compounds, like Banbury mixers, calendars, co-rotating twin-screw extruders, co-kneaders, known to one skilled in the art.

In a second step, the compounds are extruded using a 80 mm single screw extruder at olefin extrusion conditions with a progressive temperature profile starting at 80° C. at the For the welded samples, peel strength was tested on a tensile tester for 50 mm wide stripes under a drawing speed of 100 mm/min. Table 3 lists the results of the mechanical testing and the welding trials.

It is evident that the coated fabrics are in compliance with the common requirements for physical strength and flexibility. The welding tests give excellent results on peel strength, the samples for every formulation break outside the weld-seam.

Following the physical characterization of the coated fabrics, flame retardancy and fire behavior are tested according to the common European norms for building and construction membranes. Following tests were run:

EN 11925-2 Small burner test, edge and surface ignition

BS (British Standard 7837), edge ignition

EN 13823 (single burning item test).

TABLE 3

Formulations

| | Polymers | | | Additives | | | | | Ratios | |
|---|---|---|---|---|---|---|---|---|---|---|
| Example # | OBC wt % | PBE wt % | Carrier wt % | Antioxidant wt % | HALS (UV Stabilizer) wt % | TiO$_2$ wt % | Mg(OH)$_2$ wt % | Total | Organic/inorganic ratio wt % | Polymer/Flame retardant ratio wt % |
| A | 24.6 | 8.2 | — | 0.10 | 0.25 | 1.3 | 66 | 100 | 0.495 | 0.51 |
| B | 21.7 | 7.2 | — | 0.09 | 0.22 | 1.2 | 70 | 100 | 0.414 | 0.42 |
| C | 19.2 | 6.4 | — | 0.08 | 0.19 | 1.0 | 73 | 100 | 0.350 | 0.35 |
| 1 | 17.0 | 5.7 | — | 0.07 | 0.17 | 2.3 | 75 | 100 | 0.297 | 0.31 |
| 2 | 14.9 | 5.0 | 1.7 | 0.06 | 0.16 | 5.8 | 72 | 100 | 0.279 | 0.30 |
| 3 | 14.1 | 4.7 | — | 0.06 | 0.14 | 1.9 | 79 | 100 | 0.235 | 0.24 |
| 4 | 15.1 | 5.0 | — | 0.06 | 0.15 | 7.1 | 73 | 100 | 0.256 | 0.28 |
| 5 | 14.9 | 5.0 | 1.7 | 0.06 | 0.15 | 5.8 | 72 | 100 | 0.279 | 0.30 |
| D | | | | (PVC-based; low Br FR additive) | | | | | | |
| E | | | | (PVC-based; high Br FR additive) | | | | | | |

TABLE 4

Physical Properties & Welding Results

| Example # | MFI (ASTM 1238) 190 deg C./10 min | Densities/weights Compound [g/cm3] | Membrane weight [g/m2] | Thickness [mm] | Mechanicals (on scrim reinforced fabrics) Maximum Tensile Strength [Mpa] | Modulus [Mpa] | Break Elongation [%] | Welding Average peel strength [N/50 mm] | Brea outside of seam [—] |
|---|---|---|---|---|---|---|---|---|---|
| Common Requirements | | na | na | | >20 | <500 | >10 | n.s. | yes |
| A | 2.95 | 1.55 | 695 | 0.54 | 38 | 387 | 24 | 2.1 | yes |
| B | 1.89 | 1.62 | 671 | 0.53 | 33 | 438 | 33 | 1.64 | yes |
| C | 1.40 | 1.68 | 840 | 0.62 | 29 | 450 | 25 | 1.96 | yes |
| 1 | 0.70 | 1.75 | 900 | 0.6 | 26 | 544 | 26 | 1.5 | yes |
| 2 | 0.50 | 1.79 | 1046 | 0.61 | 25 | 387 | 16 | 1.9 | yes |
| 3 | 0.23 | 1.83 | 940 | 0.64 | 18 | 411 | 23 | 0.67 | yes |
| 4 | 0.07 | 1.84 | 930 | 0.58 | — | — | 15 | — | — |
| 5 | 0.50 | 1.79 | 1211 | 0.78 | 22 | 400 | 17 | — | — |
| D | | | | 0.52 | 27 | 602 | 10 | — | — |
| E | | | | 0.52 | 27 | 602 | 10 | — | — |

TABLE 5

Flammability Test Results

| | Fire Test EN 11925-2 | | | | | | | | Fire Test BS 7837 edge ignition | | |
|---|---|---|---|---|---|---|---|---|---|---|---|
| | Edge Ignition | | | | Surface Ignition | | | | Duration of Flaming [s] | Extend of Damage, length [mm] | Extend of Damage, width [mm] | Burning Droplets [—] |
| Example # | Burn Time [s] | Burn length [mm] | Time to 150 mm [s] | Burning Droplets [—] | Burn Time [s] | Burn length [mm] | Time to 150 mm [s] | Burning Droplets [—] | | | | |
| Reqt | n.s. | <150 | | no | n.s. | <150 | | no | <5 | — | — | — |
| A | >30 | >150 | 26 | no | >30 | >150 | 23 | no | 50 | >147 | >147 | no |
| B | >30 | >150 | 33 | no | >30 | >150 | 40 | no | 50 | >147 | >147 | no |
| C | >30 | 110 | na | no | >30 | 140 | na | no | 50 | 140 | 30 | no |
| 1 | 27 | 115 | na | no | >30 | 140 | na | no | 6 | 40 | 20 | no |
| 2 | 30 | 122 | na | no | 3 | 25 | na | no | 3 | 10 | 10 | no |

TABLE 5-continued

Flammability Test Results

| | | | | | | | | | | | | |
|---|---|---|---|---|---|---|---|---|---|---|---|---|
| 3 | 12 | 70 | na | no | 0 | 50 | na | no | 0 | 10 | 10 | no |
| 4 | 18 | 110 | na | no | 0 | 60 | na | no | 4 | 25 | 15 | no |
| 5 | — | — | — | — | — | — | — | — | — | — | — | — |
| D | >30 | >150 | 20 | yes | — | — | — | — | 50 | 130 | 110 | yes |
| E | 0 | 65 | na | no | 0 | 140 | na | no | — | — | — | — |

| Example # | Fire Test BS 7837 Surface ignition | | | | | EN 13823 (SBI - requirements for class B-s1-d0) | | | | |
|---|---|---|---|---|---|---|---|---|---|---|
| | Duration of Flaming [s] | Extend of Damage, length [mm] | Extend of Damage, width [mm] | Burning Droplets [—] | Form a hole [—] | Total Heat Release THR$_{600}$ [kW] | FIGRA (fire growth rate) [W/s] | SMOGRA (smoke growth rate) [m$^2$/s$^2$] | TSP (total smoke production) [m$^2$] | Burning Droplets [—] |
| Reqt | — | — | <147 | no | no | <7.5 | <120 | <30 | <50 | no |
| A | — | — | — | — | — | 1.3 | 93 | 0 | 17.6 | no |
| B | 2 | 20 | 10 | no | yes | 0.5 | 82 | 0 | 16.1 | no |
| C | 0 | 10 | 10 | no | yes | — | — | — | — | — |
| 1 | 0 | 10 | 5 | no | no/yes | — | — | — | — | — |
| 2 | — | — | — | — | — | — | — | — | — | — |
| 3 | — | — | — | — | — | — | — | — | — | — |
| 4 | 2 | 15 | 10 | no | yes | — | — | — | — | — |
| 5 | — | — | — | — | — | — | — | — | — | — |
| D | — | — | — | — | — | — | — | — | — | — |
| E | — | — | — | — | — | 0.6 | 0 | 0 | 23.6 | no |

The passing of EN 11925-2 in combination with EN 13823 at classification B-s1-d0 classify the membranes according to EN 13501-5 into class B which is novel for halogen-free, TPO-coated fabrics and membranes. As can be read from Table 3 and Table 5, all samples with organic/inorganic ratio of less than 0.35 and polymer/FR ratio less than 0.35 fulfill these classifications.

The invention claimed is:

1. A multi-layer structure, comprising:
a layer having a formulation comprising:
i) an olefin block copolymer comprising an ethylene content of at least 50 mole percent of the whole polymer, the olefin block copolymer having a polydispersity from 1.7 to 3.5, a density of from 0.850 g/cc to 0.925 g/cc, and a melt index from 0.1 g/10 min to 30 g/10 (according to ASTM D-1238 at 190° C./2.16 kg), the olefin block copolymer being an ethylene/octene block copolymer and being present in an amount from 10 wt % to 25 wt % based on the total weight of the formulation;
ii) a propylene/α-olefin copolymer comprising between 60 and less than 100 weight percent units derived from propylene and between greater than 0 and 40 weight percent units derived from at least one of ethylene and a C$_{4-10}$ α-olefin, the propylene/α-olefin copolymer having a density greater than 0.855 g/cm$^3$ and less than 0.895 g/cm$^3$ and melt flow rate from 0.1 to 500 g/10 min (according to ASTM D-1238 at 230° C./2.16 Kg); and,
iii) a halogen-free flame-retardant, a polymer to flame retardant ratio being less than 0.35, and the halogen-free flame retardant being present in an amount of greater than 60 wt % based on total weight of formulation.

2. The multi-layer structure of claim 1 having an organic/inorganic weight ratio of less than 0.35.

3. The multi-layer structure of claim 1, wherein the halogen-free flame retardant includes magnesium hydroxide.

4. The multi-layer structure of claim 1, wherein the ethylene content is greater than 80 mole percent of the whole ethylene/octane block copolymer.

5. The multi-layer structure of claim 4, wherein the melt index of the olefin block copolymer is from 0.1 g/10 (according to ASTM D-1238 at 190° C./2.16 kg).

6. The multi-layer structure of claim 5, wherein the melt flow rate of the propylene/α-olefin copolymer is from 0.1 to 50 g/10 min (according to ASTM D-1238 at 230° C./2.16 kg).

7. The Multi-layer structure of claim 6, wherein the propylene/α-olefin copolymer has a $M_w/M_n$ from 1.8 to 3.0.

8. The multi-layer structure claim 7, wherein the olefin block copolymer is present in an amount from 10 wt % to 25 wt % based on the total weight of the formulation.

* * * * *